May 3, 1966  J. L. BYRD  3,249,003
DEPTH-OF-FIELD CORRECTION FOR SCORE PROJECTION SYSTEM
Filed June 20, 1963
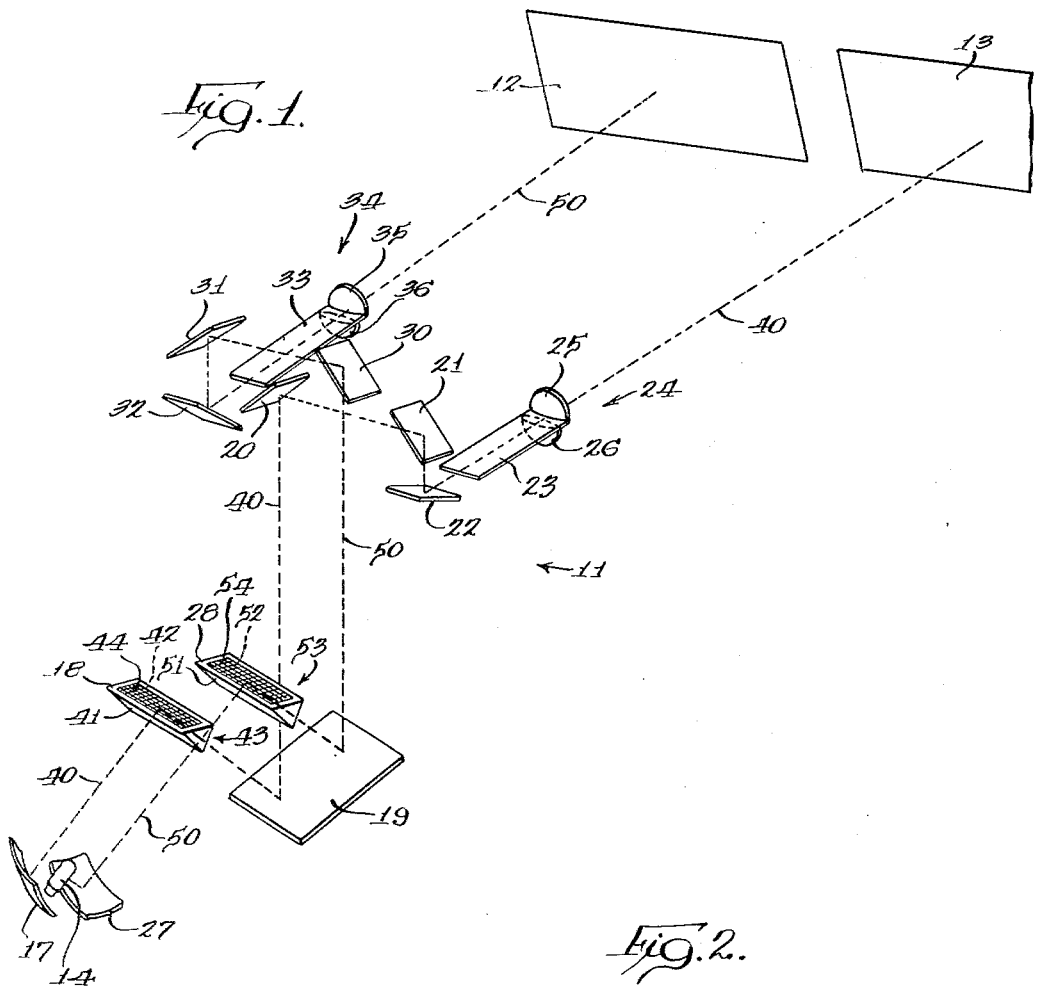
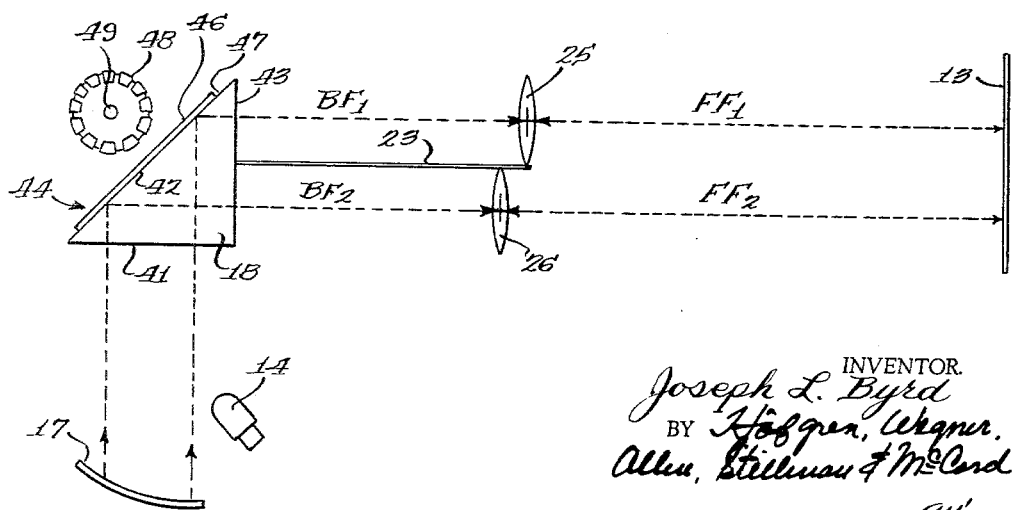
INVENTOR.
Joseph L. Byrd United States Patent Office 3,249,003
Patented May 3, 1966

3,249,003
DEPTH-OF-FIELD CORRECTION FOR SCORE
PROJECTION SYSTEM
Joseph L. Byrd, Columbus, Ohio, assignor, by mesne
assignments, to Brunswick Corporation, Chicago, Ill.,
a corporation of Delaware
Filed June 20, 1963, Ser. No. 289,204
10 Claims. (Cl. 88—24)

This invention relates to projection systems and especially to such systems useful in projecting bowling scores in a bowling lane establishment. More particularly, this invention relates to an improvement in such projection systems.

It is a general object of this invention to provide a new and useful projection system improvement.

With the advent and refinement of automatic pinsetting equipment, much attention is now being directed to production of printed bowling score information and the projection of such information to a viewing screen to which reference may be made by bowlers and spectators during a bowling game for obtaining a given bowler's status with respect to score at any time during the game.

One approach has been to project bowling scores using a platen such as a prism having an internally light-reflecting surface. Light is directed through one rectangular prism face toward the internally reflecting surface at approximately an angle not less than the critical angle of the prims to obtain generally total internal reflection or substantially total internal reflection of the light from the reflecting surface. The internal reflecting surface is used as the image source, i.e., the image to be projected is impressed on the exterior of the prism surface, and the reflected light leaves the prism by another rectangular face and is thereupon directed by a suitable optical system to a viewing screen.

Images produced in the manner described may be regarded as acceptable, but where the highest attainable degree of excellence is desired there may sometimes be an objectionable depth-of-field error. For example, where an image is reflected at an angle from a platen surface such as a prism surface, part of the source appears (to an observer or to a projection lens) to be located closer than other parts because of its angular disposition with respect to the observer or lens, creating a depth-of-field "error."

Thus as the light leaves the prism for direction to the viewing screen at the passage through the interface there may occur an objectionable error in depth-of-field. Such depth-of-field error, especially where the entire or substantially the entire internally reflecting surface of the prism is used for an image source as would be advantageous in the scoring of bowling games, is manifested in the peripheral portions of the image projected from the top and bottom of the image surface being slightly out of focus, sufficiently to be noticeable by the viewer where the image is transmitted to a remote screen. The top and bottom of the prism face herein are considered as those portions of the prism face adjacent to an intersection of two rectangular faces of the prism. If the image from the top of the prism face is focused, the image from the bottom of the prism face becomes even more out of focus; the converse is also true. Thus, such systems have been focused so that a central band of the image is in focus on the viewing screen with the top and bottom portions being slightly out of focus.

With the above in mind, another object of this invention is to provide a new and useful projection system including correction for depth-of-field.

Still another object is to provide such a system wherein depth-of-field correction is accomplished by dividing the light path or beam including an image projected from a platen into a plurality of separate light paths and directing and projecting the separate light paths to a viewing screen.

Yet another object of this invention is to provide such a projection system wherein a plurality of platens are used for projection of images to a plurality of screens, with each image being corrected for depth-of-field.

A further object of this invention is to provide such correction of depth-of-field in a projection system wherein the platen includes an internally reflective surface with an opposing light transmitting surface each in a plane intersecting the plane of the other, and especially wherein the platen is a prism.

Other objects of this invention will be apparent to those in the art from the following descriptions and the drawings, in which:

FIG. 1 is a perspective view of a projection system including a form of depth correction usable in accordance with the present invention; and FIG. 2 is a schematic illustration showing positioning of optical components with respect to each other and also illustrating acceptable positioning of printing means for printing score legends for record and projection purposes.

While an illustrative embodiment of the invention is illustrated in the drawings and will be described in detail herein, the invention is susceptible of embodiment in many different forms, and it should be understood that the present disclosure to be considered as an exemplification of the principles of the invention and is not intended to limit the scope to the embodiment illustrated.

It is contemplated that the projecion or viewing system of the present invention can be utilized in connection with one or more bowling lanes, e.g., by placement at the bowler's end of a bowling lane or plurality of adjacent bowling lanes, and that such bowling lane or bowling lanes may be equipped with automatic pin setting and ball returning equipment of conventional design.

Further, the projection system described herein may be, if desired, mounted in a suitable casing or plurality of casings which may be supported by flooring or other suitable support means, e.g., at the bowler's end of two adjacent bowling lanes. Each element of the optical system may be mounted by suitable brackets within such casings as will be apparent to those in the art.

In FIG. 1, there is provided an illustrative system in which two separate images are projected to two separate screens 12 and 13. Light source means in the form of a common light bulb 14 is suitably disposed with mirrors such as parabolic mirrors 17 and 27 to direct light through a lower face of each of prisms 18 and 28 at an angle sufficient to totally reflect the light internally from the upwardly disposed face and out the third rectangular face of each prism.

A suitable optical system is provided for directing the reflected light toward the viewing screens 12 and 13 from prisms 28 and 18, respectively. Accordingly, a planar mirror 19 reflects the light upwardly to downwardly and laterally inclined mirrors 20 and 30 which reflect the separate images laterally to mirrors 21 and 31, respectively. Mirrors 21 and 31 are each also laterally and downwardly inclined to direct the light downward to mirrors 22 and 32, respectively, which are downwardly and forwardly inclined for direction of the light through projection lenses 24 and 34 to viewing screens 13 and 12, respectively.

Prior to entry into projection lenses 24 and 34, each light path or beam transmitting the image from each prism is divided into a plurality of light path portions by dividing means illustrated in the form of horizontally disposed flat shield members 23 and 33 for separate projection of the divided portions of the image to the viewing screens. Each of the two light path portions of each light beam is passed through a separate projection means illustrated in FIG. 1 in the form of separate halves 25 and 26 or 35 and 36 of a single lens 24 or 34. The projection lenses 24 and 34 are each cut in half centrally along the diametric plane to form the halves with the halves of each independently adjusted to parallel planes for ideal focusing of each half. Shields 32 and 33 pass between the lens halves as illustrated with the lens halves being suitably secured in place. Halves 25 and 35 focus their portion of the image on the top half of the respective screen while halves 26 and 36 focus on the bottom halves of the screens.

Now tracing the light paths from source 14 to screens 12 and 13, the light paths are indicated generally by reference numerals 40 and 50 and pass respectively through prisms 18 and 28 entering faces 41 and 51, respectively, at such an angle as to be totally reflected from internally reflecting surfaces 42 and 52 and leave the prism through surfaces 43 and 53, respectively. The light paths 40 and 50 are then directed by the mirrors discussed above toward the respective projection screens, being divided into light path portions by the shield plates, which are preferably nonreflective, and transmitted through the appropriate projection lens portions.

Surfaces 42 and 52 of prisms 18 and 28 are the internally reflecting surfaces in the illustrated projection system and constitute the origin of the image for projection. Accordingly, score sheets 44 and 54 are disposed upon these surfaces. The score sheets are backed with carbon or other pressure transfer material for transferring the printed image to surface 42 or 52 as described by Roop in copending application Serial No. 288,719, entitled "Bowling Score Projector," and filed June 18, 1963. A mark on the accessible or upwardly disposed surface of each scode sheet is transmitted to surface 42 or 52 in the form of nonreflective carbon indica or the like corresponding to the indicia printed on the upper surface of the score sheet. The nonreflective areas of surface 42 or 52 created by the mark formed thereon destroy the inner reflectivity of the surface so that as the light is internally reflected therefrom, an image of the indicia is carried by the reflected light through the optical system to the viewing screen. As the light rays leave the prism and pass through the interface to a less dense medium, i.e., air, the depth-of-field error arises. When the image is split by the shield means 23 or 33, the error is then corrected by such splitting of the image and by focusing the separate halves of the image upon the viewing screen.

Thus, in the system of FIG. 1, separate projection lenses are provided for projecting each image. Further, each projection lens 24 or 34 in itself comprises a pair of separate projection lenses, each of the pair being focused on a different or separate portion of the same image on surface 42 or 52 of prism 18 or 28.

Referring particularly to FIG. 2, wherein a schematic diagram of the positioning of the lenses for focusing on different or separate portions of the same image is shown, the lenses in FIG. 2 are illustrated as true lenses which are of course also usable, rather than halves of the same lens. Light source 14 reflects a light beam through prism 18 via parabolic mirror 17 as before, picking up the image from surface 42, which image is internally reflected and leaves the prism through surface 43. The shield means in FIG. 2 is illustrated as extending the entire distance between prism 18 and the projection lenses 25 and 26 for purposes of illustration. Such extent of the shield means is not necessary and it has been found that a much shorter shield is usable as illustrated in FIG. 1; the extension of the shield rearward from the projection lenses need be only sufficient to divide the light path into separate portions. In FIG. 2, BF represents the distance between the source of the image and the center of the respective lens traveled by a given portion of the light path and FF represents the distance from the center of the lens to the viewing screen. Assuming that M is the magnification from the image to the screen and $f$ is the lens focal length, the following optical formulae apply:

(1) $\qquad BF = f(1/M + 1)$
(2) $\qquad FF = f(M + 1)$

Assuming that two lenses 25 and 26 are being used to project the reflected image from a 3 inch by 3 inch prism and that, accordingly, the projected image is being divided into two portion, and assuming that the magnification is eight times and the distance $FF_1$ as illustrated in FIG. 2 is to be eighteen feet, it follows that:

$$f_1 = \frac{FF_1}{M+1} = \frac{18 \text{ ft.}}{9} = 2 \text{ ft.}$$

(1) $BF_1 = f(1/M + 1) = 2 \text{ ft.} (\frac{1}{8} + 1) = 2.25 \text{ ft.}$

Thus, the total optical path length of $BF_1$ plus $FF_1$ is 20.25 ft. and the total optical path length of $BF_2$ plus $FF_2$ is 20.375 ft. It follows then that:

(1) and (2) $BF_2 + FF_2 = f_2(M + 1/M + 2)$
M equals 8 and $M_2$ will be approximately equal to $M_1$.
$20.375' = f_2(8 + \frac{1}{8} + 2)$
$f_2 = 2.01234567'$
$BF_2 = 2.01234567 \times 1.125 = 2.263888'$ The approximate $\frac{3}{16}$ inch focal length variation between $f_1$ and $f_2$ is small enough to ignore if the magnificaiton variation does not become excessive. Let $f_2$ equal 2 ft. and let $BF_2$ plus $FF_2$ remain 20.375 ft.

(1) and (2)

$$20.375 = 2(M + 1/M + 2)$$

$$8.1875 = M + 1/M$$

$$M^2 - 8.1875M + 1 = 0$$

$$M_2 = \frac{8.1875 \pm \sqrt{8.1875^2 - 4}}{2}$$

$$= 8.1875 + (7.9395)/2$$

$$M_2 = 8.0635$$

The difference between the magnification of the two portions of a light path projected toward the screen is not appreciable.

A comparison of the images from the improved systems with images from an unimproved system demonstrated that a system employing the two lenses or split lens was capable of correcting the depth-of-field, an appreciable improvement having been obtained compared with the system not employing the depth-of-field correction means.

Again considering FIG. 2, score sheet 44 is shown in more detail and includes an accessible printable surface, e.g., paper or the like, indicated generally by reference numeral 46 and a backing surface of carbon or the like indicated generally by reference numeral 47. The backing surface is capable of transmitting pressure marking on surface 46 to surface 42 to form a nonreflective portion on surface 42 as described above. The marking on surface 46 may be by pencil or by other suitable printing means as the illustrated print wheel 48 indexable on pivot bar 49 and movable toward and away from surface 46 for printing thereon.

I claim:
1. A projection system comprising a light transmitting platen having an internally light reflecting surface for backing a sheet adapted to impress a legend thereon, and a light source and optical means associated therewith including means for directing light into said platen through a surface thereof other than said sheet backing surface, and through said platen to reflect from said internally reflecting surface, and means for transmitting an image of said legend reflected through said platen to a viewing screen, said transmitting means comprising means dividing the image into a plurality of separate light paths and separate projection lens means for each separate light path for focusing the image on the screen.

2. A projection system comprising a light transmitting platen having an internally reflecting surface, means for making a legend on said surface, a light source and means associated therewith for directing light through said platen at an angle toward said reflecting surface for reflecting an image therefrom, a viewing screen, means for directing the reflected image to the viewing screen, and light transmitting means between said internally reflecting surface and the viewing screen for correcting depth-of-field error in the reflected image.

3. The projection system of claim 2 wherein said means for correcting depth-of-field error comprises a nontransparent, nonreflecting shield disposed parallel to the path of the reflected image dividing said path generally centrally, and separate projection lens means for separately projecting each divided portion to the viewing screen.

4. A projection system comprising a light transmitting platen having a surface for receiving an image, a light source, light supply optical means associated with said light source and platen for directing light into said platen through a surface thereof other than said image receiving surface and at an angle to said image receiving surface, means at said image receiving surface for reflecting the light back through said platen in a direction away from said image receiving surface and outward from said platen, a viewing screen, and projection optical means for transmitting the reflected image to the viewing screen, said projection optical means comprising means for dividing the light directed outward from said platen into a plurality of separate light paths, and separate projection lens means separately mounted for sepaartely focusing said separate light paths and projecting the separate light paths in a direction reconstituting an image light path to form the complete projected image on the viewing screen.

5. A projection system for projecting an image from an image receiving surface, which comprises a light transmitting platen having an internally reflecting surface, the exterior of which constitutes said image receiving surface, said image receiving surface being disposed for backing a sheet adapted to transmit a legend impressed on the exposed surface thereof to said image receiving surface, a light source, means for directing light from said light source through said platen toward said internally reflecting surface for reflecting an image of said legend therefrom and exteriorly of the platen, mirror means for directing reflected light transmitted from said platen to a position substantially upward, a plurality of mirror means for directing the reflected image from said reflecting surface toward a viewing screen, means dividing the light reflected from said reflecting surface into a plurality of separate light paths, and separate projection lens means for each separate light path for focusing the portion of reflected image in each light path upon the viewing screen, each of said projection lens means being disposed to focus an image portion on the viewing screen in a configuration reconstituting an image-like path from the plurality of light path portions to form a complete projected image on the screen.

6. In a projection system including a light source, an internally reflective platen and a viewing screen, wherein light from the light source is directed through the internally reflective platen toward an internally reflecting platen surface thereof for substantially total reflection from said surface to the viewing screen to transmit an image on said reflecting surface to said screen and wherein said platen includes a light transmitting surface in a plane intersecting the plane of said reflecting surface and permitting passage of light therefrom reflected from said reflecting surface, means for projecting the reflected light passing from said platen to the viewing screen comprising means for dividing the reflected light into two paths, a first projection lens disposed a distance of approximately $BF_1$ from said reflecting surface along the path therefrom of light of one of said two paths and a distance of approximately $FF_1$ from the viewing screen for projecting said one path to said screen, and a second projection lens disposed a distance of approximately $BF_2$ from said reflecting surface along the path therefrom of light of the other of said two paths and a distance of approximately $FF_2$ from said screen for projecting said other path to said screen, wherein:

$BF_1$ and $BF_2$ each$=f(1/M+1)$,
$FF_1$ and $FF_2$ each$=f(M+1)$,
$M=$magnification at image, and
$f=$lens focal length.

7. The projection system of claim 6 wherein said dividing means comprises a horizontally disposed shield member splitting the reflected light into two paths and wherein each of the separate projection lens means comprises generally one-half of a projection lens secured adjacent either side of said shield member.

8. A score projection system comprisnig a light transmitting prism having an internally reflecting surface, means for marking a legend on said surface, a light source, an overhead viewing screen, curved mirror means for directing light from said light source into said prism through a surface thereof other than said sheet backing surface and through said prism toward said sheet backing surface and transmitting an image of the score legend from said sheet reflected through said prism and outwardly from another surface of said prism, a plurality of mirror means for directing reflected light from said prism upward, by-passing said prism to a position substantially above said reflecting surface and thence to the viewing screen, means for splitting the reflected image into a plurality of paths, and means in each of said paths for correcting depth-of-field error in the reflected image between the prism and the viewing screen, each of said correcting means being disposed a different distance from said screen.

9. A projection system for projecting images separately from a plurality of separate image receiving surfaces, which comprises a plurality of light transmitting prisms each having an internally reflecting surface, the exterior of which constitutes one of said separate image receiving surfaces, each of said image receiving surfaces being disposed for backing a sheet adapted to transmit a legend impressed on the exposed surface thereof to said image receiving surface, a light source, curved mirror means for directing light from said light source through each of said prisms toward each of said internally reflecting surfaces for reflecting an image of said legend therefrom and exteriorly of the prism, mirror means for directing reflected light transmitted from each prism to a position substantially upward, a plurality of mirror means for separately directing the reflected image from each of said reflecting surfaces toward a viewing screen, separate means dividing the light reflected from each reflecting surface into a plurality of separate light paths and separate projection lens means for each separate light path for focusing the portion of reflected image in each light path upon viewing screen means, said viewing screen means including a plurality of viewing screens, one for each image receiving surface, each of said projection lens means being disposed to focus an image portion of one image on one of said screen in a configuration reconstituting an image light path from its plurality of light path portions to form a separate complete projected image on the screen.

10. A projection system comprising a light transmitting prism having an internally reflecting platen surface for receiving an image, a light source and means associated therewith for directing light through said prism toward said internally reflecting surface and reflecting an image of said score legend therefrom, a viewing screen, and optical means for directing the image to a viewing screen including means for correcting depth-of-field error in the reflected image comprising separate projection lens means disposed in the path of the image beyond the prism for separately focusing separate portions of the image to the viewing screen.

References Cited by the Examiner

UNITED STATES PATENTS

| | | | |
|---|---|---|---|
| 1,919,922 | 7/1933 | Baker et al. | 88—24 |
| 2,045,093 | 6/1936 | Newcomer | 352—57 X |
| 2,098,767 | 11/1937 | Thomas | 88—1 |
| 2,381,260 | 8/1945 | Coker | 88—24 |
| 2,685,227 | 8/1954 | Brietzke | 88—24 |
| 2,824,490 | 2/1958 | Fitzgerald | 88—24 |
| 2,858,731 | 11/1958 | Rehorn | 352—57 X |
| 3,138,059 | 6/1964 | White | 88—24 |
| 3,174,414 | 3/1965 | Myer | 88—24 X |

NORTON ANSHER, *Primary Examiner.*

H. H. FLANDERS, *Assistant Examiner.*